United States Patent
Grof et al.

(10) Patent No.: US 11,446,951 B2
(45) Date of Patent: Sep. 20, 2022

(54) AUTHENTICATION OF METALLIC OBJECTS

(71) Applicants: SECURITY MATTERS LTD., Kibbutz Ketura (IL); SOREQ NUCLEAR RESEARCH CENTER, Yavne (IL)

(72) Inventors: Yair Grof, Rehovot (IL); Tzemah Kislev, Mazkeret Bathya (IL); Nadav Yoran, Tel Aviv (IL); Yaara Bondy, Rehovot (IL); Haggai Alon, Kibbutz Naan (IL)

(73) Assignees: SOREQ NUCLEAR RESEARCH CENTER, Yavne (IL); SECURITY MATTERS LTD., Kibbutz Ketura (IL)

( * ) Notice: Subject to any disclaimer, the term of this patent is extended or adjusted under 35 U.S.C. 154(b) by 1087 days.

(21) Appl. No.: 16/074,226

(22) PCT Filed: Feb. 2, 2017

(86) PCT No.: PCT/IL2017/050121
§ 371 (c)(1),
(2) Date: Jul. 31, 2018

(87) PCT Pub. No.: WO2017/134660
PCT Pub. Date: Aug. 10, 2017

(65) Prior Publication Data
US 2021/0178802 A1    Jun. 17, 2021

Related U.S. Application Data

(60) Provisional application No. 62/290,146, filed on Feb. 2, 2016.

(51) Int. Cl.
B42D 25/373    (2014.01)
B42D 25/445    (2014.01)
(Continued)

(52) U.S. Cl.
CPC ......... *B42D 25/373* (2014.10); *B42D 25/378* (2014.10); *B42D 25/445* (2014.10); *B42D 25/47* (2014.10); *C09D 5/022* (2013.01); *C09D 7/61* (2018.01); *C09D 7/63* (2018.01); *C09D 133/04* (2013.01); *C09K 11/00* (2013.01); *C09K 11/08* (2013.01); *G01N 23/083* (2013.01); *G01N 23/223* (2013.01)

(58) Field of Classification Search
CPC ...... B05D 1/60; G01N 23/083; G01N 23/223; B42D 25/30; B42D 25/378; B42D 25/415; B42D 25/455
See application file for complete search history.

(56) References Cited

U.S. PATENT DOCUMENTS 6,477,227 B1    11/2002   Kaiser et al.
6,501,825 B2 *  12/2002   Kaiser .................. G01N 23/223
                                                            378/44

(Continued)

FOREIGN PATENT DOCUMENTS

DE    10 2013 013 108 A1    2/2015

*Primary Examiner* — Kregg T Brooks
(74) *Attorney, Agent, or Firm* — Browdy and Neimark, PLLC

(57) ABSTRACT

Provided is an anti-counterfeit marking technique for verifying authenticity of objects using x-ray fluorescence (XRF) analysis.

16 Claims, 5 Drawing Sheets method 100

(51) Int. Cl.

| | |
|---|---|
| *B42D 25/47* | (2014.01) |
| *G01N 23/083* | (2018.01) |
| *B42D 25/378* | (2014.01) |
| *G01N 23/223* | (2006.01) |
| *C09D 7/61* | (2018.01) |
| *C09D 7/63* | (2018.01) |
| *C09D 5/02* | (2006.01) |
| *C09D 133/04* | (2006.01) |
| *C09K 11/00* | (2006.01) |
| *C09K 11/08* | (2006.01) |

(56) References Cited

U.S. PATENT DOCUMENTS

| | | |
|---|---|---|
| 6,850,592 B2 | 2/2005 | Schramm et al. |
| 8,590,800 B2 | 11/2013 | Baque |
| 8,864,038 B2 | 10/2014 | Marka et al. |
| 2007/0111021 A1 | 5/2007 | Nakamura et al. |
| 2013/0074449 A1* | 3/2013 | Grunler ................ G09F 3/0291 53/397 |
| 2013/0230138 A1 | 9/2013 | Jeter et al. |

* cited by examiner

Figure 1 – method 100

102 — Applying a marking composition to at least one surface of a metallic object, the marking composition comprising at least one marker for generating at least one marking x-ray signal, at least one binder for binding the at least one marker to the metallic object and, optionally, for generating at least one auxiliary x-ray signal

104 — Irradiating the metallic object with x-ray or Gamma-ray radiation

106 — detecting a response x-ray signal arriving from the metallic object in response to the to the x-ray or gamma-ray radiation

108 — processing the response x-ray signal, thereby obtaining an enhanced response signal

110 — Identifying in the enhanced response signal the at least one of the marking signals and at least one of (i) auxiliary signals and/or (ii) signals indicative of metals present in the metallic object, thereby authenticating the metallic object

Figure 2 – method 200

| | |
|---|---|
| 202 | Applying a marking composition to at least one surface of a metallic object, the marking composition comprising at least one marker for generating at least one marking x-ray signal, at least one binder for binding the at least one marker to the metallic object and, optionally, for generating at least one auxiliary x-ray signal, wherein the concentrations of the at least one marker and optionally the at least one binder are determined according to a preselected code; |
| 204 | Storing the concentrations of the at least one marker and, optionally, the binder with in the marking composition, and, optionally, the concentration of at least one metal with in the metallic object in a database |
| 206 | Irradiating the metallic object with x-ray or Gamma-ray radiation |
| 208 | Detecting a response x-ray signal arriving from the metallic object in response to the to the x-ray or gamma-ray radiation |
| 210 | Processing the response x-ray signal, thereby obtaining an enhanced response signal |
| 212 | Utilizing the enhanced response signal to measure the concentrations of the at least one marker and optionally at least one of the materials present in the binder within the marking composition, and optionally the concentration of at least one metal within the metallic object. |
| 214 | Comparing the measured concentrations of the at least of the markers and optionally at least one of the materials present in the binder, and at least of the metals present in the metallic object to the preselected code. |

AUTHENTICATION OF METALLIC OBJECTS

FIELD OF THE INVENTION

The present invention generally provides a novel anti-counterfeit marking technique for verifying authenticity of metallic objects (such as coins, medallions, and jewelry) using x-ray fluorescence (XRF) analysis, with improved sensitivity and accuracy.

BACKGROUND

Counterfeit deterrence has become of high importance in the utility of many daily routines. Bills and coins of currency, legal documents, keys, passports, identification cards, jewelry and many other daily objects must be authentic to be useful.

Many of the methods and systems used for authenticating of objects are unsatisfactory for reasons including, inter alia, complexity of existing methods, the required time for carrying them out, and the destructive nature of the methods. In many cases, on-the-spot determination of counterfeit goods is not possible as a sample of the object, or the object itself, must be sent to an off-site laboratory for analysis. These technologies are time-consuming and suffer from a high degree of false positives or false negatives.

REFERENCES

[1] U.S. Pat. No. 8,590,800
[2] U.S. Pat. No. 6,850,592
[3] U.S. Pat. No. 6,501,825
[4] U.S. Pat. No. 6,477,227
[5] U.S. Pat. No. 8,864,038

SUMMARY OF THE INVENTION

The inventors of the invention disclosed herein have developed a method and system in which one or more compounds that are appended to objects, that require authentication, are detected by x-ray fluorescence (XRF). The anti-counterfeit marking technique and tools provided by the invention are highly generic, insensitive to object materials and structure and thus permit verification of authenticity of a great variety of objects, e.g., metallic objects (such as coins, medallions, and jewelry), as well as non-metallic objects. The process for marking the objects, e.g., metallic objects, involves applying a novel marking composition to at least a region of a surface of the object, such that upon examination by XRF analysis, authenticity may be verified.

The marking composition applied to the object generally includes a low concentration of a marking system, the system typically comprising a plurality of marker materials (herein "markers"); each of said markers being XRF sensitive in the sense that they emit an X-Ray signal in response to interrogation (irradiation) by X-Ray or gamma ray radiation.

In an aspect of the invention, there is provided a marker composition comprising at least one XRF-sensitive marker and optionally at least one surface binding material (permitting association of said marker to at least a surface region of an object, e.g., a binder material and/or an adhesive material), wherein the concentration of the at least one marker in the composition is between 0.1 and 10,000 ppm.

In some embodiments, the composition is suitable for application onto at least one region of a metallic surface.

In some embodiments, and depending on the actual method of applying or marking an object with a marker composition, the composition need not comprise at least one binder. For example, where chemical or physical deposition methods are concerned, the marker composition may be free of any binder materials. In other cases, where wet deposition or solution deposition methods are utilized, a binder material may be used. Thus, according to certain embodiments of the invention, the composition may include from about 50% to more than 99% of the at least one binder. In other embodiments, a composition may comprise about 70% binder, about 20% solvent (which evaporates once deposited on the object) and about 10% markers and other compounds. In such compositions comprising a solvent, the final composition without the solvent, will be about 90% binder and 10% marker and other compounds.

Thus, in some embodiments, the invention provides a marker composition comprising at least one XRF-sensitive marker and at least one surface binding material, wherein the concentration of the at least one marker in the composition is between 0.1 and 10,000 ppm.

In other embodiments, the invention provides a marker composition for depositing by, e.g., chemical or physical vapor deposition methods, the composition comprising at least one XRF-sensitive marker in an amount sufficient to result in a film comprising between 0.1 and 10,000 ppm of said marker, relative to the surface material on which the film is formed.

In another aspect, the invention provides a composition comprising at least one XRF-sensitive marker, at least one surface binding material, and at least one agent selected from at least one polymerization initiator, at least one wetting agent, at least one etching agent, at least one dispersant and at least one solvent.

In another aspect, the invention contemplates a film-forming composition comprising at least one XRF-sensitive marker, at least one surface binding material, and at least one chemical etchant.

The invention further contemplates a film-forming composition for forming a film on at least a region of a surface material, the composition comprising at least one XRF-sensitive marker, at least one surface binding material and at least one chemical etchant for increasing surface contact with said marker and said binder.

The concentrations or amounts of the marker(s) and the binding material(s) within any marking composition of the invention may be set according to a preselected code, which can be measured by XRF analysis, after application of the composition onto the object, in the authentication stage. In general, the marking composition may include one or more markers with concentrations within the range of 0.1 to 10,000 ppm. In some embodiments, the composition comprises at least one marker in a concentration between 0.1 and 1,000 ppm, 0.1 and 900 ppm, 0.1 and 800 ppm, 0.1 and 700 ppm, 0.1 and 600 ppm, 0.1 and 500 ppm, 0.1 and 400 ppm, 0.1 and 300 ppm, 0.1 and 200 ppm, 0.1 and 100 ppm, 0.1 and 10 ppm, 0.1 and 9 ppm, 0.1 and 8 ppm, 0.1 and 7 ppm, 0.1 and 6 ppm, 0.1 and 5 ppm, 0.1 and 4 ppm, 0.1 and 3 ppm, 0.1 and 2 ppm, 0.1 and 1 ppm, 1 and 1,000 ppm, 1 and 900 ppm, 1 and 800 ppm, 1 and 700 ppm, 1 and 600 ppm, 1 and 500 ppm, 1 and 400 ppm, 1 and 300 ppm, 1 and 200 ppm, 1 and 100 ppm, 1 and 90 ppm, 1 and 80 ppm, 1 and 70 ppm, 1 and 60 ppm, 1 and 50 ppm, 1 and 40 ppm, 1 and 30 ppm, 1 and 20 ppm, 1 and 10 ppm, 1 and 9 ppm, 1 and 8 ppm, 1 and 7 ppm, 1 and 6 ppm, 1 and 5 ppm, 1 and 4 ppm, 1 and 3 ppm or 1 and 2 ppm.

In some embodiments, the composition comprises at least one marker in a concentration between about 0.1 and 50 ppm, 0.1 and 45 ppm, 0.1 and 40 ppm, 0.1 and 35 ppm, 0.1 and 30 ppm, 0.1 and 25 ppm, 0.1 and 20 ppm, 0.1 and 15 ppm, 0.1 and 10 ppm, 0.1 and 5 ppm, 0.1 and 4.5 ppm, 0.1 and 4 ppm, 0.1 and 3.5 ppm, 0.1 and 3 ppm, 0.1 and 2.5 ppm, 0.1 and 2 ppm, 0.1 and 1.5 ppm, 0.1 and 1 ppm, 0.1 and 0.9 ppm, 0.1 and 0.8 ppm, 0.1 and 0.7 ppm, 0.1 and 0.6 ppm, 0.1 and 0.5 ppm, 0.2 and 50 ppm, 0.2 and 45 ppm, 0.2 and 40 ppm, 0.2 and 35 ppm, 0.2 and 30 ppm, 0.2 and 25 ppm, 0.2 and 20 ppm, 0.2 and 15 ppm, 0.2 and 10 ppm, 0.2 and 5 ppm, 0.3 and 50 ppm, 0.3 and 45 ppm, 0.3 and 40 ppm, 0.3 and 35 ppm, 0.3 and 30 ppm, 0.3 and 25 ppm, 0.3 and 20 ppm, 0.3 and 15 ppm, 0.3 and 10 ppm, 0.3 and 5 ppm, 0.4 and 50 ppm, 0.4 and 45 ppm, 0.4 and 40 ppm, 0.4 and 35 ppm, 0.4 and 30 ppm, 0.4 and 25 ppm, 0.4 and 20 ppm, 0.4 and 15 ppm, 0.4 and 10 ppm, 0.4 and 5 ppm, 0.5 and 50 ppm, 0.5 and 45 ppm, 0.5 and 40 ppm, 0.5 and 35 ppm, 0.5 and 30 ppm, 0.5 and 25 ppm, 0.5 and 20 ppm, 0.5 and 15 ppm, 0.5 and 10 ppm or 0.5 and 5 ppm.

In some embodiments, the composition comprises at least one marker in a concentration sufficient for marking a single object. In such embodiments, the concentration may be suitable for obtaining a film on the surface of the object, said film comprising between about 0.1 and 1,000 ppm, 0.1 and 900 ppm, 0.1 and 800 ppm, 0.1 and 700 ppm, 0.1 and 600 ppm, 0.1 and 500 ppm, 0.1 and 400 ppm, 0.1 and 300 ppm, 0.1 and 200 ppm, 0.1 and 100 ppm, 0.1 and 10 ppm, 0.1 and 9 ppm, 0.1 and 8 ppm, 0.1 and 7 ppm, 0.1 and 6 ppm, 0.1 and 5 ppm, 0.1 and 4 ppm, 0.1 and 3 ppm, 0.1 and 2 ppm, 0.1 and 1 ppm, 1 and 1,000 ppm, 1 and 900 ppm, 1 and 800 ppm, 1 and 700 ppm, 1 and 600 ppm, 1 and 500 ppm, 1 and 400 ppm, 1 and 300 ppm, 1 and 200 ppm, 1 and 100 ppm, 1 and 90 ppm, 1 and 80 ppm, 1 and 70 ppm, 1 and 60 ppm, 1 and 50 ppm, 1 and 40 ppm, 1 and 30 ppm, 1 and 20 ppm, 1 and 10 ppm, 1 and 9 ppm, 1 and 8 ppm, 1 and 7 ppm, 1 and 6 ppm, 1 and 5 ppm, 1 and 4 ppm, 1 and 3 ppm or 1 and 2 ppm.

In some embodiments, the composition comprises at least one marker in a concentration sufficient for marking a single object, the concentration being between about 0.1 and 50 ppm, 0.1 and 45 ppm, 0.1 and 40 ppm, 0.1 and 35 ppm, 0.1 and 30 ppm, 0.1 and 25 ppm, 0.1 and 20 ppm, 0.1 and 15 ppm, 0.1 and 10 ppm, 0.1 and 5 ppm, 0.1 and 4.5 ppm, 0.1 and 4 ppm, 0.1 and 3.5 ppm, 0.1 and 3 ppm, 0.1 and 2.5 ppm, 0.1 and 2 ppm, 0.1 and 1.5 ppm, 0.1 and 1 ppm, 0.1 and 0.9 ppm, 0.1 and 0.8 ppm, 0.1 and 0.7 ppm, 0.1 and 0.6 ppm, 0.1 and 0.5 ppm, 0.2 and 50 ppm, 0.2 and 45 ppm, 0.2 and 40 ppm, 0.2 and 35 ppm, 0.2 and 30 ppm, 0.2 and 25 ppm, 0.2 and 20 ppm, 0.2 and 15 ppm, 0.2 and 10 ppm, 0.2 and 5 ppm, 0.3 and 50 ppm, 0.3 and 45 ppm, 0.3 and 40 ppm, 0.3 and 35 ppm, 0.3 and 30 ppm, 0.3 and 25 ppm, 0.3 and 20 ppm, 0.3 and 15 ppm, 0.3 and 10 ppm, 0.3 and 5 ppm, 0.4 and 50 ppm, 0.4 and 45 ppm, 0.4 and 40 ppm, 0.4 and 35 ppm, 0.4 and 30 ppm, 0.4 and 25 ppm, 0.4 and 20 ppm, 0.4 and 15 ppm, 0.4 and 10 ppm, 0.4 and 5 ppm, 0.5 and 50 ppm, 0.5 and 45 ppm, 0.5 and 40 ppm, 0.5 and 35 ppm, 0.5 and 30 ppm, 0.5 and 25 ppm, 0.5 and 20 ppm, 0.5 and 15 ppm, 0.5 and 10 ppm or 0.5 and 5 ppm.

In some embodiments, the composition comprises at least one marker in a concentration between 0.1 and 10,000 ppm, 0.1 and 9,000 ppm, 0.1 and 8,000 ppm, 0.1 and 7,000 ppm, 0.1 and 6,000 ppm, 0.1 and 5,000 ppm, 0.1 and 4,000 ppm, 0.1 and 3,000 ppm, 0.1 and 2,000 ppm, 0.1 and 1,000 ppm, 1 and 10,000 ppm, 10 and 10,000 ppm, 100 and 10,000 ppm, 1,000 and 10,000 ppm, 2,000 and 10,000 ppm, 3,000 and 10,000 ppm, 4,000 and 10,000 ppm, 5,000 and 10,000 ppm, 6,000 and 10,000 ppm, 7,000 and 10,000 ppm, 8,000 and 10,000 ppm or 9,000 and 10,000 ppm.

The marker concentration may be determined based on the size of the object, the characteristics of the film to be formed on the object and other parameters having to do with the stability of the marking composition. For any typical object, on average, the amount of marker material(s) may be between 0.1 and 10,000 ppm per object, relative to the surface material. The amount of the marker may be homogenously distributed on the surface of the object or may be distributed in material increments throughout the surface of the object. For example, where the amount of a marker material in a composition suitable for application onto a single object is 100 ppm, the composition may be applied such that 10 equal portions are applied onto 10 different regions of the object, each portion comprising 10 ppm of the marker material.

As used herein, the marker material is a compound which includes one or more elements identifiable by XRF. In other words, the marker is or comprises at least one element of the periodic table of the elements, which in response to X-Ray or gamma-ray (primary radiation) radiation emits an X-Ray signal (secondary radiation) with spectral features (i.e. peaks in a particular energy/wavelength) characteristic of the element (an x-ray response signal as XRF signature). An element having such response signal is considered XRF-sensitive.

In some embodiments, the marker is an element or a material comprising one or more elements, the element having an electronic transition between atomic energy levels which generates an identifiable x-ray signal. In some embodiments, the marker is not an organic material. In some embodiments, the marker is a metal salt, an organometallic material or a metal oxide.

In some embodiments, the marker material is an element or a material comprising an selected from Si, P, S, Cl, K, Ca, Br, Ti, Fe, V, Cr, Mn, Co, Ni, Ga, As, Fe, Cu, Zn, Ga, Rb, Sr, Y, Zr, Nb, Mo, Tc, Ru, Rh, Ag, Cd, In, Sn, Sb, Te, I, Cs, Ba, La and Ce. In some embodiments, the marker is a material comprising one or more elements selected from Si, P, S, Cl, K, Ca, Br, Ti, Fe, V, Cr, Mn, Co, Ni, Ga, As, Fe, Cu, Zn, Ga, Rb, Sr, Y, Zr, Nb, Mo, Tc, Ru, Rh, Ag, Cd, In, Sn, Sb, Te, I, Cs, Ba, La and Ce.

In some embodiments, the marker material is an element or a material comprising Si, P, S, Cl, K, Ca, Br, Ti, Fe, V, Cr, Mn, Co, Ni, Ga, As, Fe, Cu, Zn, Ga, Rb, Sr, Y, Zr, Nb, Mo, Tc, Ru, Rh, Ag, Cd, In, Sn, Sb, Te, I, Cs, Ba, La and/or Ce.

In some embodiments, the marker is one or more of Ca, Ti, Mo, Zn, Zr, and Sb. In other embodiments, the marker is Ca or Ti or Mo or Zn or Zr or Sb. In other embodiments, the marker is Ca. In other embodiments, the marker is Ti. In other embodiments, the marker is Mo. In other embodiments, the marker is Zn. In other embodiments, the marker is Sb.

In some embodiments, the marker is a metal salt or a metal complex comprising at least one metal atom, as disclosed herein, and at least one anion or a complexing moiety. The anion or complexing moiety may be inorganic or organic. In some embodiments, the marker is a metal complex comprising an anion that may be any negatively charged atom or groups of atoms (e.g., in the form of ligands), which may be singly charged or multi-charged (with a charge of −2 or higher).

In some embodiments, the anion is inorganic. Non-limiting examples of inorganic anions include $HO^-$, $F^-$, $Cl^-$, $Br^-$, $I^-$, $NO_2^-$, $NO_3^-$, $ClO_4^-$, $SO_4^{-2}$, $SO_3^-$, $PO_4^-$ and $CO_3^{-2}$.

In some embodiments, the anion is organic. Non-limiting examples of organic anions include acetate ($CH_3COO^-$), formate ($HCOO^-$), citrate ($C_3H_5O(COO)_3^{-3}$), acetylacetonate, lactate ($CH_3CH(OH)COO^-$), oxalate ($(COO)_2^{-2}$) and any derivative of the aforementioned.

In some embodiments, the metal salt is a metal oxide.

Exemplary materials comprising at least one element identifiable by XRF include $BaSO_4$, AgBr, AgI, AgCl, $CuCO_3$, $CaCO_3$, $CaSO_4$, $PbI_2$ and $MgSO_4$.

In some embodiments, the marker is a marker combination comprising two or more elements or two or more materials each comprising at least one same or different elements; each element may be presented in a different oxidation state; as different metal complex; different ligands; at different concentrations; or presented in different carriers within the marking composition.

In some embodiments, the marker combination comprises a plurality of marker elements, each being present in different concentrations or form, to permit a unique signature with spectral features characteristic not only of the specific elements in the combination but also of their relative concentrations.

The marker in a marker combination or independent of other markers in a composition may be in a metal form, a salt form, an oxide form, a polymer comprising (in a chemical or a physical interaction) said one or more elements, an organometallic compound, or a complex which includes one or more of the elements.

The at least one surface binding material used in compositions of the invention is a material which binds or promotes binding of the marker to the surface of the object.

The at least one surface binding material may be a single material or a combination of materials, which independently or in combination permits irreversible association of the marker/marker combination or any other component of the marking composition to a surface region. The at least one surface binding material is one or more of a binder material, an adhesive material, an adhesive promoter material, a polymer and a pre-polymer, as known in the art.

In some embodiments, the at least one surface binding material is at least one binder and at least one adhesion promoter.

In some embodiments, the at least one surface binding material is at least one binder material and/or at least one adhesion promoter, independently of the other, or in combination promote binding of the marker material or any component of the marking composition to the surface of the object.

In some embodiments, the binder is an organic binder. In some embodiments, the binder is an inorganic binder, such as a silicone binder. In further embodiments, the binder is a polymeric material, or a pre-polymer which in the presence of radiation polymerizes into a polymer.

In embodiments of the invention, where the binder is a polymeric material, it may be selected amongst thermoset polymers. Non-limiting examples of such polymers include polyurethane acrylates, poly-acrylates, poly-epoxy amines, poly-epoxy anhydrides, poly-esters and poly-styrenes.

In some embodiments, the binder is a poly-acrylate.

In some embodiments, the composition of the invention comprises at least one pre-polymer, in a form selected from a monomer, an oligomer, a resin material, or any combination thereof, which upon irradiation, in the presence of at least one initiator, afford a polymeric material, as defined herein.

In some embodiments, the composition comprises at least one marker, at least one binder material, at least one polymerization initiator, and optionally at least one agent selected from at least one adhesion promoter, at least one wetting agent, at least one etching agent, at least one dispersant and at least one solvent.

In some embodiments, the composition comprises at least one marker, at least one binder material, at least one adhesion promoter and at least one agent selected from at least one polymerization initiator, at least one wetting agent, at least one etching agent, at least one dispersant and at least one solvent.

In some embodiments, the composition comprises at least one marker, at least one binder material, at least one wetting agent and at least one agent selected from at least one polymerization initiator, at least one adhesion promoter, at least one etching agent, at least one dispersant and at least one solvent.

In some embodiments, the composition comprises at least one marker, at least one binder material, at least one etching agent and at least one agent selected from at least one polymerization initiator, at least one adhesion promoter, at least one wetting agent, at least one dispersant and at least one solvent.

In some embodiments, the composition comprises at least one marker, at least one binder material, at least one dispersant and optionally at least one agent selected from at least one polymerization initiator, at least one adhesion promoter, at least one wetting agent, at least one etching agent, and at least one solvent.

In some embodiments, the composition comprises at least one marker, at least one binder material, at least one polymerization initiator, at least one adhesion promoter, at least one wetting agent, at least one etching agent, at least one dispersant and at least one solvent.

In some embodiments, the at least one binder is a pre-polymer or a material selected from a polymer, an oligomer, a monomer, a resin or any combination thereof requiring cross-linking and/or polymerization. In such embodiments, the composition of the invention may also comprise at least one initiator for promoting cross-linking and/or polymerization. The initiator may be used in combination with light irradiation at a suitable wavelength.

Thus, as used herein, the at least one initiator is at least one material which affects polymerization and/or crosslinking of any one polymeric, oligomeric or monomeric materials present in the marking composition prior to coat forming, i.e. prior to polymerization. In some embodiments, the initiator is at least one thermal initiator or at least one photoinitiator. In some embodiments, the initiator is at least one photoinitiator, which is optionally selected from aromatic alpha-hydroxy ketones, alkoxyoxybenzoins, acetophenones, acylphosphine oxides, bisacylphosphine oxides.

In some embodiments, the at least one photoinitiator is selected from 1-hydroxy cyclohexyl phenyl ketone, 2-hydroxy-2-methyl-1-phenyl-propan-1-one, bis(2,6-dimethoxybenzoyl)-2,4-4-trimethylpentyl phosphine oxide (DM-BAPO), bis(2,4,6-trimethylbenzoyl)-phenyl phosphineoxide, 2,4,6-trimethylbenzyldiphenyl phosphine oxide, 2,4,6-trimethylbenzoyl diphenylphosphine oxide, benzoin methyl ester and ethyl 4-(N,N-dimethylamino)benzoate.

The at least one adhesion promoter is any material that, alone or in combination with the at least one binder material, promotes and maintains an interaction (chemical or physical) between any component in the composition and the surface region. In some embodiments, the adhesion promoter may be hydroxy-functionalized copolymer with acidic groups, oligomers in the form of aromatic acid methacrylate half-esters or aromatic acid acrylate half-ester blends in a solvent or a monomer.

In some embodiments, the adhesion promoter is selected based on the binder material. In other embodiments, the adhesion promoter is selected independently of the binder material.

The adhesion promoter may be selected amongst polyamides, epoxides and silanes. In other embodiments, the adhesion promoter is selected amongst silanes. Examples of silane adhesion promoters include octyltriethoxysilane, mercapto propyltriethoxysilane, cyanopropyltrimethoxysilane, 2-(3,4-epoxycyclohexyl)ethyl trimethoxysilane, 2-(3,4-epoxycyclohexyl)ethyltriethoxysilane, 3-(trimethoxysilyl)propylmethacrylate, 3-(Trimethoxysilyl)propylacrylate, (3-glycidyloxypropyl) trimethoxysilane, 3-glycidoxypropyltriethoxysilane, 3-methacryloxypropyl trimethoxy silane and 3-acryloxypropyltrimethoxysilane.

The at least one wetting agent is selected amongst substances that reduce the surface tension of water or the liquid carrier, e.g., solvent or dispersant, causing the water or liquid to spread across or penetrate more easily into the surface region on which a film of the composition is to be formed. In some embodiments, the wetting agent is selected to improve wetting of the surface region of the metallic substrate. The wetting agents may be selected amongst Span and Tween materials, namely may be selected amongst partial esters of fatty acids (e.g., lauric acid, palmitic acid, stearic acid and oleic acid) and hexitol anhydrides derived from sorbitol, optionally containing polyoxyethylene chains. In some embodiments, the at least one wetting agent is of the Tween type, such as Tween 80, and polyethylene glycols.

The etchant or etching agent is selected to cause surface modifications to improve adhesion or generally association, optionally irreversibly, of the marking composition to the surface region of the object. The etching agent may be selected amongst inorganic acids such as nitric acid, sulfuric acid, phosphoric acid; organic acids such as acetic acid, citric acid, tartaric acid, methanesulfonic acid; inorganic bases such as potassium hydroxide, sodium hydroxide; ammonia; organic bases such as amines, quaternary ammonium hydroxide.

Depending on the specific utility, surface treatment may be affected by means different from chemical etching or may be carried out prior to application of the composition onto a surface region of the object. For example, where inclusion of an etching material in a composition is not desirable, the surface region to be coated with a film of said composition may be pre-treated, either by chemical or non-chemical etching, to thereby achieve the degree of surface modification necessary to permit association to the marker materials. Thus, under such embodiments, each of the compositions of the invention is free of an etching agent.

The composition is typically in solution form. The components of the composition may be fully solubilized in a carrier solvent or may be in dispersed form. In other cases, the components of the composition may be presented in encapsulated or granulated or miscible form to permit their dissolution in the liquid carrier. It is desirable, that any such form does not affect the XRF signature of the film formed from the specific composition. For most applications, the composition is thus a liquid composition comprising at least one solvent and optionally at least one dispersant which permits homogenous dissolution of the marker and the other components in the marking composition, thereby enabling the marking composition to contain suitable concentrations of markers.

For other purposes, or for maintaining long and stable shelf-life conditions, the composition may be formulated as a solid composition, free of any liquid carrier. In combinations where one or more of the composition components is a liquid at room temperature, it may be formulated into a non-liquid form by, e.g., encapsulation, loading on a matrix material, etc. Thus, in some embodiments, the composition of the invention may be a solvent-free composition. The solution form may be generated or regenerated by dissolution of the solid composition in a suitable solvent or liquid carrier prior to application onto a surface region of an object.

In some embodiments, where the composition is a liquid composition, e.g., a solution or a dispersion or a suspension, or otherwise any composition containing a solvent, the solvent may be water. Alternatively, the solvent may be selected amongst organic solvents, inorganic solvents or aqueous media comprising at least one water-soluble liquid.

In some embodiments, any of the compositions of the invention may further comprise at least one matting agent, such as fumed silica.

In some embodiments, the composition comprises in addition to the marker and the binder at least one solvent, and at least one dispersant which assist in the dissolution of the marker, and for enabling suitable marker concentrations. In some embodiments, the marking composition may include a material having at least one benzene ring, optionally substituted by OH and/or COOH groups. The marking composition may also include at least one adhesion promoter, which may be hydroxy-functional copolymer with acidic groups, oligomers in the form of aromatic acid methacrylate half ester or aromatic acid acrylate half ester blends in a solvent or monomer.

The invention further provides compositions according to the invention, each being independently suitable as XRF-sensitive marking compositions, the compositions being selected from:

1. A composition comprising a marker material comprising Ca and/or Ti and/or Mo and/or Zn and/or Zr and/or Sb, wherein the at least one binding material is acrylate-based; said etching material is selected from phosphoric acid and 2-propenoic acid.

2. A composition comprising a marker material comprising Ca and/or Ti and/or Mo and/or Zn and/or Zr and/or Sb, wherein the at least one binding material comprises at least one binder material and at least one adhesion promoter; said etching material is phosphoric acid and/or 2-propenoic acid.

3. A composition comprising a marker material comprising Ca and/or Ti and/or Mo and/or Zn and/or Zr and/or Sb, wherein the at least one binding material comprises at least one binder and at least one adhesion promoter being methacryloxy silane and/or methacryloxypropyl terminated polydimethylsiloxane and/or acrylic silane and/or aromatic acid methacrylate half ester; said etching material is phosphoric acid and/or 2-propenoic acid.

4. A composition comprising a marker material comprising Ca and/or Ti and/or Mo and/or Zn and/or Zr and/or Sb, wherein the at least one binding material comprises at least one binder material selected from acrylate resins and at least one adhesion promoter; said etching material is phosphoric acid and/or 2-propenoic acid.

5. A composition comprising a marker material comprising Ca and/or Ti and/or Mo and/or Zn and/or Zr and/or Sb, wherein the at least one binding material comprises at least one binder material selected from acrylate resins and at least one adhesion promoter being methacryloxy silane and/or methacryloxypropyl terminated polydimethylsiloxane and/or acrylic silane and/or aromatic acid methacrylate half ester; said etching material is phosphoric acid and/or 2-propenoic acid.

6. A composition comprising a marker material comprising an XRF-sensitive element, at least one binding material being acrylate-based; and an etching material being phosphoric acid and/or 2-propenoic acid.

7. A composition comprising a marker material comprising an XRF-sensitive element, at least one binding material comprising at least one binder material and at least one adhesion promoter; and an etching material being phosphoric acid and/or 2-propenoic acid.

8. A composition comprising a marker material comprising an XRF-sensitive element, at least one binding material comprising at least one binder and at least one adhesion promoter being methacryloxy silane and/or methacryloxypropyl terminated polydimethylsiloxane and/or acrylic silane and/or aromatic acid methacrylate half ester; and an etching material being phosphoric acid and/or 2-propenoic acid.

9. A composition comprising a marker material comprising an XRF-sensitive element, at least one binding material comprising at least one binder material selected from acrylate resins and at least one adhesion promoter; and an etching material being phosphoric acid and/or 2-propenoic acid.

10. A composition comprising a marker material comprising an XRF-sensitive element, at least one binding material comprising at least one binder material selected from acrylate resins and at least one adhesion promoter being methacryloxy silane and/or methacryloxypropyl terminated polydimethylsiloxane and/or acrylic silane and aromatic acid/or methacrylate half ester; and an etching material being phosphoric acid and/or 2-propenoic acid.

In some embodiments, in each of compositions 1-10 above, the marker element is Ca or Ti or Mo or Zn or Zr or Sb or any combination of two or more elements.

In some embodiments, in each of compositions 1-10 above, the at least one adhesion promoter is methacryloxy silane or methacryloxypropyl terminated polydimethylsiloxane or acrylic silane or aromatic acid methacrylate half ester or any combination of two or more materials.

In some embodiments, in each of compositions 1-10 above, the etching material is phosphoric acid or 2-propenoic acid or a combination thereof.

In some embodiments, in each of compositions 1-10 above, the composition is a solvent-free composition. In some embodiments, the solvent is 1-methoxy-2-propanol or isopropanol or a combination of the two. In some embodiments, the solvent is water-free. In other embodiments, the solvent further comprises an amount of water.

In some embodiments, compositions of the invention are formed of the materials listed in Table 1 below.

TABLE 1 non-limiting examples of compositions according to the invention.

| Marker | binder | Adhesion promoter | Etching agent | solvent |
|---|---|---|---|---|
| Ca, Ti, Mo, Zn, Zr, Sb | Acrylate resin (polyacrylate) | Methacryloxy silane<br><br>Methacryloxypropyl terminated polydimethylsiloxane<br>Acrylic silane<br>Aromatic acid methacrylate half ester | Phosphoric acid<br>2-propenoic acid<br><br>Acrylic acid | 1-methoxy-2-propanol<br>isopropanol |

Any of the marking compositions of the invention may be applied to any region of the surface of an object. The whole of the surface may be coated with the composition. Alternatively, a single or multiple regions may be coated. In some embodiments, the coating may be in the form of a thin film (or coat, or layer), which may be continuous or discontinuous, or in the form of a predetermined pattern. The pattern may be formed as a continuous pattern or a pattern comprising a plurality of spaced-apart patterns. The marker composition may be applied on more than one region of the object so as to custom-fit authentication.

The film or pattern formed on the surface may have a thickness of between 0.1 and 10 microns. In some embodiments, the thickness is between 0.1 and 4 microns, or between 0.1 and 3 microns, or between 0.1 and 2.5 microns, or between 0.1 and 2 microns.

The surface onto which the composition is applied is typically the top-most surface region of the object or substrate. The bulk object material need not be of the same material as its surface.

In objects having a 3-dimensional structure, which may be of any complexity, the surface may be any exposed surface or any surface which may be reached for the purpose of forming the film thereon. The surface may be a flat surface region which is substantially 2-dimensional or any region having a feature or a pattern which is 3-dimensional. The surface may be of any complexity, having any features contour and of any material composition. Due to the versatility of the composition, and its ability to associate onto any surface material, without damaging the material, its surface features and characteristics, as defined herein, the surface material may be selected from glass, plastics, polymers, wood, metal, cloth, fibrous materials etc. The material surface may be treated with the marking composition immediately after the object has been formed, during the manufacture of the object or at any point thereafter.

In some embodiments, the surface is a metallic surface material which may be of any metal or metal composition or any combination of metals. The metallic surface may be of any oxidation may be a metal oxide, a metal alloy or any non-metallic material which contains at least an amount of a metal. The metallic surface may be treated with the marking composition immediately after the metallic surface has been formed or at any point thereafter.

The marking composition may be applied to newly manufactured objects, e.g., metallic objects (for example as part of a production line) or alternatively to used objects. Notwithstanding the nature of the surface, its composition and its age, the marking composition layer is durable to wear of the surface, and to application of washing or chemicals.

Despite the fact that a composition applied on any region of the object's surface forms a film on the top-most surface, the film does not alter the appearance of the object, nor does it affect the mechanical/physical, chemical, electric, or magnetic properties thereof.

While the marker material is typically the component which is used for the authentication of the object, the binder may also be used for authentication purposes; that is, the XRF signature of the binder may be used to verify the authenticity of the object. In addition, the XRF signature of at least one of the metals present in a metallic object may be used for authenticating the metallic object.

The object may be any object which authentication may be desired or required, such objects may be, for example, coins of currency, jewelry, medals and other daily objects.

Thus, the invention further provides an object, as defined herein, having on at least a region thereof a film comprising at least one marker and at least one binding material as defined herein.

In some embodiments, the object is coated with a film on one or more regions of the object surface. In other embodiments, the amount or concentration of the marker material(s), as defined herein, permits XRF detection. In such embodiments, the concentration in the film is between about 0.1 and 1,000 ppm, or any mid-range or amount as disclosed hereinabove.

In some embodiments, the amount or concentration of the marker material(s) may be between about 0.1 and 900 ppm, 0.1 and 800 ppm, 0.1 and 700 ppm, 0.1 and 600 ppm, 0.1 and 500 ppm, 0.1 and 400 ppm, 0.1 and 300 ppm, 0.1 and 200 ppm, 0.1 and 100 ppm, 0.1 and 10 ppm, 0.1 and 9 ppm, 0.1 and 8 ppm, 0.1 and 7 ppm, 0.1 and 6 ppm, 0.1 and 5 ppm, 0.1 and 4 ppm, 0.1 and 3 ppm, 0.1 and 2 ppm, 0.1 and 1 ppm, 1 and 1,000 ppm, 1 and 900 ppm, 1 and 800 ppm, 1 and 700 ppm, 1 and 600 ppm, 1 and 500 ppm, 1 and 400 ppm, 1 and 300 ppm, 1 and 200 ppm, 1 and 100 ppm, 1 and 90 ppm, 1 and 80 ppm, 1 and 70 ppm, 1 and 60 ppm, 1 and 50 ppm, 1 and 40 ppm, 1 and 30 ppm, 1 and 20 ppm, 1 and 10 ppm, 1 and 9 ppm, 1 and 8 ppm, 1 and 7 ppm, 1 and 6 ppm, 1 and 5 ppm, 1 and 4 ppm, 1 and 3 ppm or 1 and 2 ppm. In some embodiments, the concentration is between about 0.1 and 50 ppm, 0.1 and 45 ppm, 0.1 and 40 ppm, 0.1 and 35 ppm, 0.1 and 30 ppm, 0.1 and 25 ppm, 0.1 and 20 ppm, 0.1 and 15 ppm, 0.1 and 10 ppm, 0.1 and 5 ppm, 0.1 and 4.5 ppm, 0.1 and 4 ppm, 0.1 and 3.5 ppm, 0.1 and 3 ppm, 0.1 and 2.5 ppm, 0.1 and 2 ppm, 0.1 and 1.5 ppm, 0.1 and 1 ppm, 0.1 and 0.9 ppm, 0.1 and 0.8 ppm, 0.1 and 0.7 ppm, 0.1 and 0.6 ppm, 0.1 and 0.5 ppm, 0.2 and 50 ppm, 0.2 and 45 ppm, 0.2 and 40 ppm, 0.2 and 35 ppm, 0.2 and 30 ppm, 0.2 and 25 ppm, 0.2 and 20 ppm, 0.2 and 15 ppm, 0.2 and 10 ppm, 0.2 and 5 ppm, 0.3 and 50 ppm, 0.3 and 45 ppm, 0.3 and 40 ppm, 0.3 and 35 ppm, 0.3 and 30 ppm, 0.3 and 25 ppm, 0.3 and 20 ppm, 0.3 and 15 ppm, 0.3 and 10 ppm, 0.3 and 5 ppm, 0.4 and 50 ppm, 0.4 and 45 ppm, 0.4 and 40 ppm, 0.4 and 35 ppm, 0.4 and 30 ppm, 0.4 and 25 ppm, 0.4 and 20 ppm, 0.4 and 15 ppm, 0.4 and 10 ppm, 0.4 and 5 ppm, 0.5 and 50 ppm, 0.5 and 45 ppm, 0.5 and 40 ppm, 0.5 and 35 ppm, 0.5 and 30 ppm, 0.5 and 25 ppm, 0.5 and 20 ppm, 0.5 and 15 ppm, 0.5 and 10 ppm or 0.5 and 5 ppm.

In some embodiments, the film comprises an amount of at least one marker material, at least one binder material selected amongst poly-acrylates, and having a film thickness of between 0.1 and 4 microns, or between 0.1 and 3 microns, or between 0.1 and 2.5 microns, or between 0.1 and 2 microns.

In some embodiments, the film comprises two or more marker materials, each being based on a different element, as defined herein.

In some embodiments, the film comprises a selection of materials listed in Table 1 herein, wherein each of the metal atoms is in a salt or complex form, selected as above.

In some embodiments, the object is a metallic object, wherein the marker material comprises at least one element which is different from any of the elements present in the object. The object may be selected from coins, jewelry, medals and other metallic objects.

Objects according to the invention may be marked for preventing counterfeit or misuse and for enabling authentication. According to general methods of the invention, to enable authentication, the object must first be marked, namely appended or coated or associated, on at least one region of its surface, with a film comprising a marker material(s), as defined herein. The film comprises in addition to the marker materials(s) one or more of the materials present in compositions of the invention. Where the composition initially includes a volatile solvent or material, the concentration of the volatile material may be diminished when the film is formed on the object and eventually solidifies or dries. Thus, for example, while a composition of the invention may comprise a solvent, for achieving dissolution of the various components, the film eventually formed on a surface region of an object may not comprise the solvent. Once the film is formed, the object may be authenticated at any stage of the object life.

Thus, the invention further provides a method for marking and authenticating an object, the method comprising applying a marking composition according to the invention to at least a surface region of an object and irradiating said object with x-ray or gamma-ray radiation to thereby determine object authenticity.

In some embodiments, the method further comprises detection of an x-ray signal received from said object in response to the x-ray or gamma-ray radiation and processing of the signal.

In further embodiments, where the marking composition comprises at least one marker for generating at least one marking signal in response to XRF interrogation (which includes irradiation by x-ray or gamma-ray radiation) and at least one binder for generating one or more auxiliary signal in response to XRF interrogation. The method comprises detecting an x-ray signal arriving from the object in response to the x-ray or gamma-ray radiation; processing the detected response x-ray signal, to identify the at least one marking signal and auxiliary signals therein, thereby authenticating the object.

According to some embodiments of the invention, the processing includes filtering the detected response x-ray signal to obtain an enhanced response signal having an improved signal to noise (SNR) and/or improved signal to clutter (SNC) as compared to the originally detected response x-ray signal. Thereafter, the enhanced response signal is processed to determine whether it includes the at least one marking signal and/or the auxiliary signals which are associated with the object's authenticity. For instance, the processing may include analyzing the power of the response signal at one or more frequencies associated with the marking and/or auxiliary signals and thereby authenticating the object by determining if the response signal includes marking and/or auxiliary signals. The analysis may include for example performing spectral analysis to determine the power spectra of the response signal in a certain frequency band overlapping with the frequencies of said marking and/or auxiliary signals, and/or is may be specifically designed to detect/determine the power of the response signal at the specific one or more frequencies of the marking and/or auxiliary signals.

According to certain embodiments of the present invention, a specifically designed filtering method is carried out to filter the detected X-Ray response signal to obtain the enhanced response signal, which is then further processed to authenticate the object. This specifically designed filtering technique provides dramatic improvement of the SNR and/or SNC of the enhanced response signal, thereby allowing the use of the marking compositions which comprise, e.g., small/minute amounts of the XRF sensitive materials, making the marking composition undetectable by conventional techniques. Accordingly, the marking signal and/or the auxiliary signals may go undetected by conventional XRF techniques thus making counterfeiting of the marked objects significantly more difficult.

However, in some embodiments of the present invention the object is marked by such compositions, which provide only weak marking signal and/or weak auxiliary signals, while the novel specifically designed filtering technique/method is carried out in the authentication stage obtain the enhanced response signal from which the weak marking signals and/or the weak auxiliary signals can be detected.

Examples of this novel filtering technique, which can be used to obtain enhanced response signal with high enough SNR and/or SCR are described for example in U.S. provisional patent application No. 62/142,100 and/or WO 2016/157185, and/or Applications claiming priority therefrom, being herein incorporated by reference.

More specifically, according to some embodiments of the present invention the filtering is performed by applying a time series analysis technique to at least a portion of the wavelength spectral profile of the detected X-Ray response signal to suppress trend and/or periodic components from the wavelength spectral profile. The trend and periodic components, which are suppressed by the filtering, are associated with at least one of clutter and noise appearing in the detected portion of the X-Ray signal and sourced from one or more of the following: instrumental noise of the detection device, one or more foreign materials in the vicinity of the object, back-scattering noise, and interfering signals from neighboring peaks. Therefore the enhanced response signal in which trend and/or periodic components in the spectrum are suppressed has higher SNR and/or higher SCR as compared to the detected X-Ray response signal which allows identification of the weak marking and/or auxiliary signals therein.

To this end, as indicated above, the marking composition (after being implemented and cured/dried on the object which is to be marked), may include one or more markers with concentrations within the range of 0.1 to 10,000 ppm. In some cases the cured/dried marking composition includes markers concentrations within the range of 0.1 to 200 ppm and/or within a range of 0.5 to 200 ppm. The lower limit of these ranges (0.1-0.5 ppm) allows reliable detection of the marker by the specifically designed method for filtering the XRF response signal as described above. On the other hand, the higher limit of this range (200 ppm) is relatively low thereby limiting the ability to use certain conventional XRF techniques for detecting the marker in the composition.

Where the object has a metallic surface, the method may include identifying in the enhanced response signal the at least one marking signal and at least one of (i) the auxiliary signals and/or (ii) signals indicative of one or more metals present in the metallic object.

In some embodiments, the method further comprises utilizing the enhanced response signal to measure the concentration of at least part of the at least one marker in the marking composition.

In further embodiments, the method comprises utilizing the enhanced response signal to measure the concentration of at least one of the materials present in the binder in the marking composition.

In other embodiments, the method further comprises utilizing the enhanced response signal to measure the concentration of at least one of the metals present in a metallic object.

In some embodiments, the concentrations of the at least one marker and optionally the at least one binder within the marking composition are determined according to a preselected code. In some embodiments, the preselected code includes data indicative of the concentration of at least one of the metals in a metallic object.

In some embodiments, the method further comprised comparing the concentrations of the at least one marker and optionally the at least one of binder in the marking composition to the preselected code. In some embodiments, the method further comprises comparing the concentration of least one of the metals within a metallic object to the preselected code.

It should be noted that due to the improved SNR and SCR in the enhanced response signal obtained by the filtering technique described above, the concentrations of the XRF markers in the marking composition marking the object may be determined/measured with fine resolution as low as 0.5 ppm (e.g., with resolution in the range of 0.5 to 30 ppm) and in some cases even with further improved resolution below 0.5 ppm.

Accordingly, the concentrations of the XRF marking materials in the marking composition may vary between different marking compositions by as little as 0.5 ppm (the resolution of the measurement). In some cases, the concentrations of the marking materials within the marking composition may range between 0.5 to 200 ppm. Accordingly, the 0.5 ppm resolution of the measurement gives about 400 code options for each marking material included in the composition. In some cases, the concentration of a marking material may vary in differently coded marking compositions by about 1 to 2 ppm. This gives about K=100 to 200 code options (where K being the number of different concentration which can be distinguished by the measurement, based on its resolution) for each marking material included in the composition were marking composition with concentration of the marking materials in the composition ranges between 0.5 to 200 ppm. In some cases, the concentration of the marking material is allowed to be between 0.5 to 10,000 ppm, each marking material is in this case associated with the order of K=~10,000 code options (considering the measurement resolution is about 1 ppm). Thus, using N different markers, wherein each can be added to the marking composition, enables the marking composition to code K to the power of N different "code-words".

To this end, authenticating the XRF code in the marking composition may include processing the detected XRF response signal, or the enhanced response signal (being the detected XRF response signal filtered/processed as described above), and determining the amounts (e.g., in ppm) of the XRF markers included therein. In some cases, the amounts may be determined with fine resolution of 1-2 ppm or even with a finer resolution of about 0.5 ppm. Then the XRF code can be determined based in the detected amounts considering the detection resolution to which the marking composition was designed.

In some embodiments, the marking composition does not affect the conductivity, capacitance, resistance, magnetic susceptibility of a metallic object.

In some embodiments, the marking composition does not alter any visible feature of the object.

In some embodiments, the marking composition does not alter the weight of the metallic object by more than 0.1%.

In some embodiments, the object is a metallic object selected from a newly produced coin, and a coin which is in circulation.

The marking composition may be generally applied to a surface region of an object by any method known in the art, including: immersion, dipping, printing, wiping, painting, ultrasonic spray nozzle coating, ultrathin polymeric coating—produced by dipping in dilute polymeric solution or by spraying\spreading dilute polymeric solution, spin coating, hot melt coating, knife-over-roll coating, conformal coating, electrolytic plating, electroless plating, plasma spraying, and electrophoretic deposition (EPD).

In addition, the marking composition may be applied to the surface of an object by vacuum deposition methods, wherein the deposition process is carried out at a pressure below atmospheric pressure or in vacuum (i.e. in a vacuum chamber). In general, vacuum deposition processes enable the deposition of layers which range in thickness from single atom up to a few millimeters. The material being deposited on a substrate in such methods is in vapor state.

In some embodiments, the vacuum deposition process which may be used in such marking techniques utilizes Chemical Vapor Deposition (CVD), in which the vapor is generated by chemical reactions which include one or more precursors. The precursors typically comprising organometallic compounds. The marking composition which is deposited on the object by CVD may comprise organometallic material. The category of CVD includes various processes such as low-pressure chemical vapor deposition (LPCVD), Plasma-Enhanced Chemical Vapor Deposition (PECVD), Plasma-Assisted CVD (PACVD), and Atomic Layer Deposition (ALD).

Alternatively, or additionally, the process of depositing the marker material(s) on the object includes Physical Vapor Deposition (PVD) in which the vapor source is a solid or a liquid. The marking composition which is deposited on an object by PVD may comprise metals, organometallic compounds and metallic oxides. A PVD process may use techniques such as sputtering, cathodic arc deposition, thermal evaporation, laser ablation serving as a (solid) precursor to generate vapor, and electron beam deposition, to generate the deposited particles in a vapor phase.

Vacuum deposition methods allow for depositing a layered structure carrying one or more markers, e.g. uniform overall layers of compounds (including markers) over the surface of an object, e.g. a continuous (unpatterned) layered structure/film or layered structure/film formed by discrete spaced-apart regions of the deposited compounds (being deposited via a mask).

The accuracy of the vacuum deposition process and the uniformity of the layer facilitates fast and accurate measurement of the concentration of deposited markers. The marking layer deposited by vacuum deposition methods is resilient and wear resistant.

In some embodiments, the composition is applied by printing, e.g., inkjet printing. The ink-jet printing method may be any such method known in the art. In some embodiments, the application is achieved by drop-on-demand inkjet printing.

As known in the art, in such an inkjet printing device a piezoelectric or heating device attach to the printing head, forces the material to escape the printing nozzle in the form of pico-liter drops. The ability to apply such small amounts of marking composition to the metallic object contributes to the invisibility of the marking composition and to fact that the marking composition does not affect the mechanical, chemical, electric, and/or magnetic of the metallic object.

In the authentication stage of objects formed according to the invention, the object, e.g., metallic object, is irradiated with x-ray or gamma-ray radiation and the x-ray emitted by the object (the x-ray response signal) is detected. Since the quantity of marking composition applied to the object may be very small, and since the detection of the x-ray response signal may be carried out by a small or even handheld/portable device (with a relatively weak primary radiation) in an uncontrolled environment (without vacuum conditions), the authenticating signals may be obscured by the background including back scattered radiation, clutter (radiation from foreign materials in the vicinity of the metallic object), and electronic noise. Therefore, the x-ray response signal is processed/filtered in order to amplify the authenticating signals and improve the Signal to Noise Ratio (SNR) and Signal to Clutter Ration (SCR). This may be achieved by using statistical methods such as the time series technique indicated above to remove trend and/or periodic components from the spectrum of the detected XRF response signal and thereby obtaining an enhanced response signal in which the authenticating (marker and/or auxiliary signals) are amplified/stand-out from the clutter/noise. However, commonly used methods for filtering out the background (e.g. Gaussian filtering) may also reduce all or part of the authentication signals.

In accordance with the present invention, once an enhanced response signal is obtained the authenticity of the metallic object can be verified according to the presence of the authenticating signals in the enhanced response signal.

In an embodiment of the present invention concentrations of the markers and the binders within the marking composition are set according to a preselected code, which can be measured by XRF analysis in the authentication stage. For example, using N different markers wherein each can be added to the marking composition (and later measured in the authentication stage) in K different concentration, enables the marking composition to code K to the power of N different "code-words". Using different concentrations of one or more binders would increase the number of possible words in the preselected code.

Thus, the invention further provides a system for marking and authenticating an object, the system comprising:
   a marking module for applying a marking composition to at least a region of the object, the marking composition comprising at least one marker and at least one binder;
   a reading module comprising an emitter for emitting x-ray or gamma-ray radiation towards the object and a detector for detecting a response signal x-ray signal arriving from the metallic object;
   a signal processor for processing the x-ray response signal and obtaining an enhanced response signal, wherein the signal processor is configured to identify in the enhanced response signal at least one marker signal associated with the at least one marker, and optionally at least one of (i) auxiliary signal associated with the at least binder and (ii) a signal indicative of at least one of the metals present in the metallic object.

In some embodiments, the signal processor is adapted to filter the x-ray response signal by using statistical processing, such as time series analysis, and to thereby obtain the enhanced response signal, by which the concentrations of the marking materials can be determined with improved resolution and/or accuracy. In some embodiments the statistical processing is adapted to remove at least one of the trend and/or periodic components from the spectral profile (e.g. from the power spectrum) of the detected X-Ray response signal.

In some embodiments, the concentrations of the at least one marker and optionally the at least one binder in the marking composition are determined according to a preselected code. In some embodiments, the preselected code includes data indicative of the concentration of at least one of the metals in the metallic object.

In some embodiments, the system further comprises a database for storing the preselected code.

In some embodiments, the signal processor utilizes the enhanced response signal to determine the concentrations of the at least one marker and optionally the at least one binder in the marking composition. In some embodiments, the processor is adapted to determine the concentrations with resolution in the order of 1 to 2 ppm, or with a resolution in the order of 0.5 ppm.

In some embodiments, the signal processor utilizes the enhanced response signal to determine the concentration of at least one of the metals present in the metallic object.

In some embodiments, the signal processor is configured to determine the authenticity of the metallic object by comparing the concentrations of the at least one marker and optionally the at least one binder in the marking composition to the preselected code.

In some embodiments, the signal processor is configured to compare the concentration of at least one metal present in the metallic object to the preselected code.

In some embodiments, the marking module comprises an inkjet printing device. In some embodiments, the marking module comprises an ultrasonic dispersion device.

In some embodiments, the marking composition does not affect the conductivity, capacitance, resistance, magnetic susceptibility of a metallic object.

In some embodiments, the marking composition does not alter the any visible feature of an object.

In some embodiments, the marking composition does not alter the weight of the metallic object by more than 0.1%.

In some embodiments, the object is a metallic object selected from a newly produced coin and a coin which is in circulation.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 1 is a schematic illustration of a method for marking and authenticating metallic objects, according to some embodiments of the invention.

FIG. 2 is a schematic illustration of a method for marking and authenticating metallic objects, according to further embodiments of the present invention.

DETAILED DESCRIPTION OF EMBODIMENTS

Figure 3:
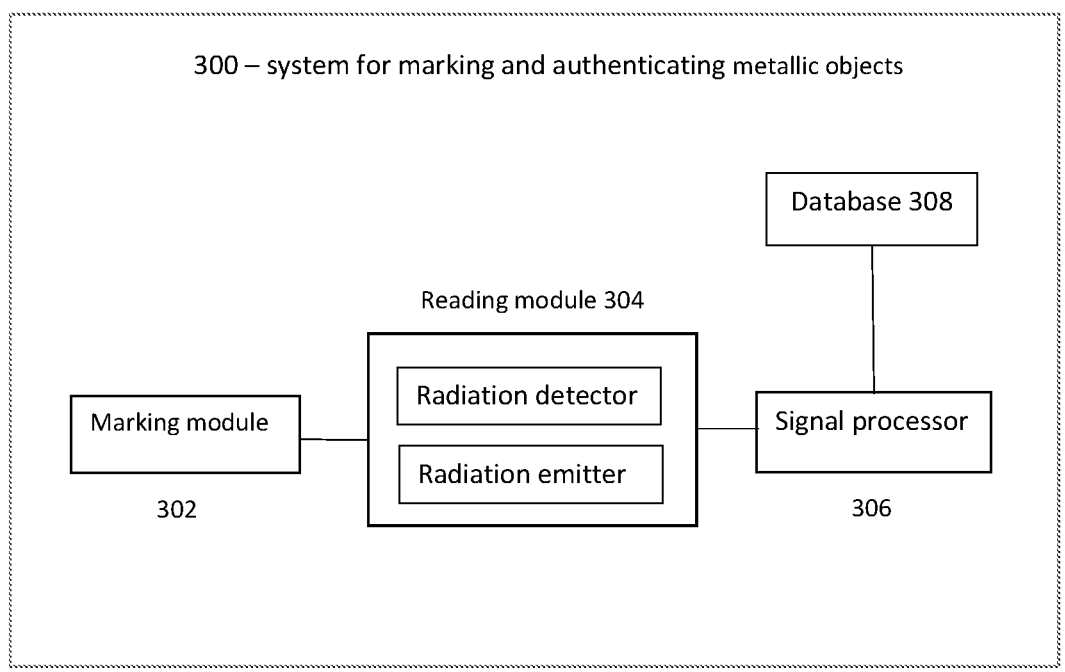
FIG. 3 is a schematic illustration of a system for marking and authenticating metallic objects according to certain embodiments of the present invention.

Reference is now made to FIG. 1 which is a schematic illustration of a method for marking and authenticating metallic objects, according to some embodiments of the invention. In the Figure, the metallic object is generally referenced 100. Procedure 102 of the method is carried out in a first preparation stage, in which the metallic object is marked. In procedure 102 a marking composition is applied to the metallic object. The marking composition includes one or more markers and one or more binders. According to this embodiment, the marker comprises a selected element or compound which can be identified by its x-ray fluorescence (XRF) signature. Namely, a compound generating an x-ray signal in response to being irradiated by x-ray or gamma-ray radiation wherein the response x-ray signal includes one or more spectral features associated with and identifying the material. Hereinafter, the particular XRF signature of a marker is referred to as a "marking signal".

The binder binds the marker to the surface of the metallic object, as explained herein. For example, the binder may be a thermoset polymer such as polyurethane acrylate, polyacrylate, poly-epoxy amine, poly-epoxy anhydride, polyester, and poly-styrene. In addition to markers and the binders the marking composition may include solvents, and dispersants which assist in dissolving the marker enabling the marking composition to contain suitable concentrations of markers. For example, the marking composition may include a benzene ring substituted with OH and/or COOH groups. The marking composition may also include adhesion promoters which assist in binding the marker to the surface of the metallic object. For example, the marking composition may include hydroxy-functional copolymer with acidic groups, oligomers in the form of aromatic acid methacrylate half ester or aromatic acid acrylate half ester blends in solvent or monomer.

The XRF signatures of one or more of the binders (hereinafter referred to as "auxiliary signals) may be used, in addition to the marking signals to authenticate the metallic object. In addition, the XRF signature of at least one of the metals present in the metallic object for authenticating the metallic object (hereinafter the marking signal, the auxiliary signal and the XRF signatures of the metals in the metallic object are collectively referred to as "authenticating signals").

The marking composition does not affect the mechanical/physical or chemical properties of the metallic object. In particular, the marking composition is invisible to a naked eye and does not deform or alter any physical features which may be printed engraved or coined on the surface of the metallic object. Furthermore, the marking composition does not alter the electric or magnetic properties (e.g. conductivity, capacitance, magnetic susceptibility) of the metallic object. Therefore, any electrical or magnetic test conducted on the metallic object measuring any of the above properties does not reveal whether the metallic object is marked by the marking composition or not.

Procedures 104, 106, 108 and 110 are carried out at a second authentication stage wherein the metallic object is examined and authenticated. In procedure 104, the metallic object is irradiated with x-ray or gamma-ray radiation causing the metallic object and the marking composition, if present, to generate x-ray signals in response. In procedure 106 the response x-ray signal arriving from the metallic object is detected. In procedure 108 the response x-ray signal is processed in order to reduce noise and clutter caused, for example, by back-scattering, instrumental noise of the detection device and foreign materials in the vicinity of the metallic object, and to amplify or enhance the authenticating signals relatively to the background. The processing may include for example statistical processing, such as time series analysis, which may be carried out to remove at least one of the trend and/or periodic components from the spectral profile (e.g. from the power spectrum) of the detected X-Ray response signal, and/or both trend and periodic components. However, naïve filtration of the background and the noise, for example by using common methods such as quasi-Gaussian spectroscopy amplifier and Gaussian filtering may also significantly reduce all or part of the authentication signals. Hence, more advanced signal processing methods should be employed. For example, the response x-ray signal may be processed using statistical methods such as time series analysis. The output of procedure 108 is an "enhanced signal" having an improved Signal to Noise Ratio (SNR) and Signal to Clutter Ratio (SCR) from which the authenticating signals can be accurately derived.

Figure 4A:
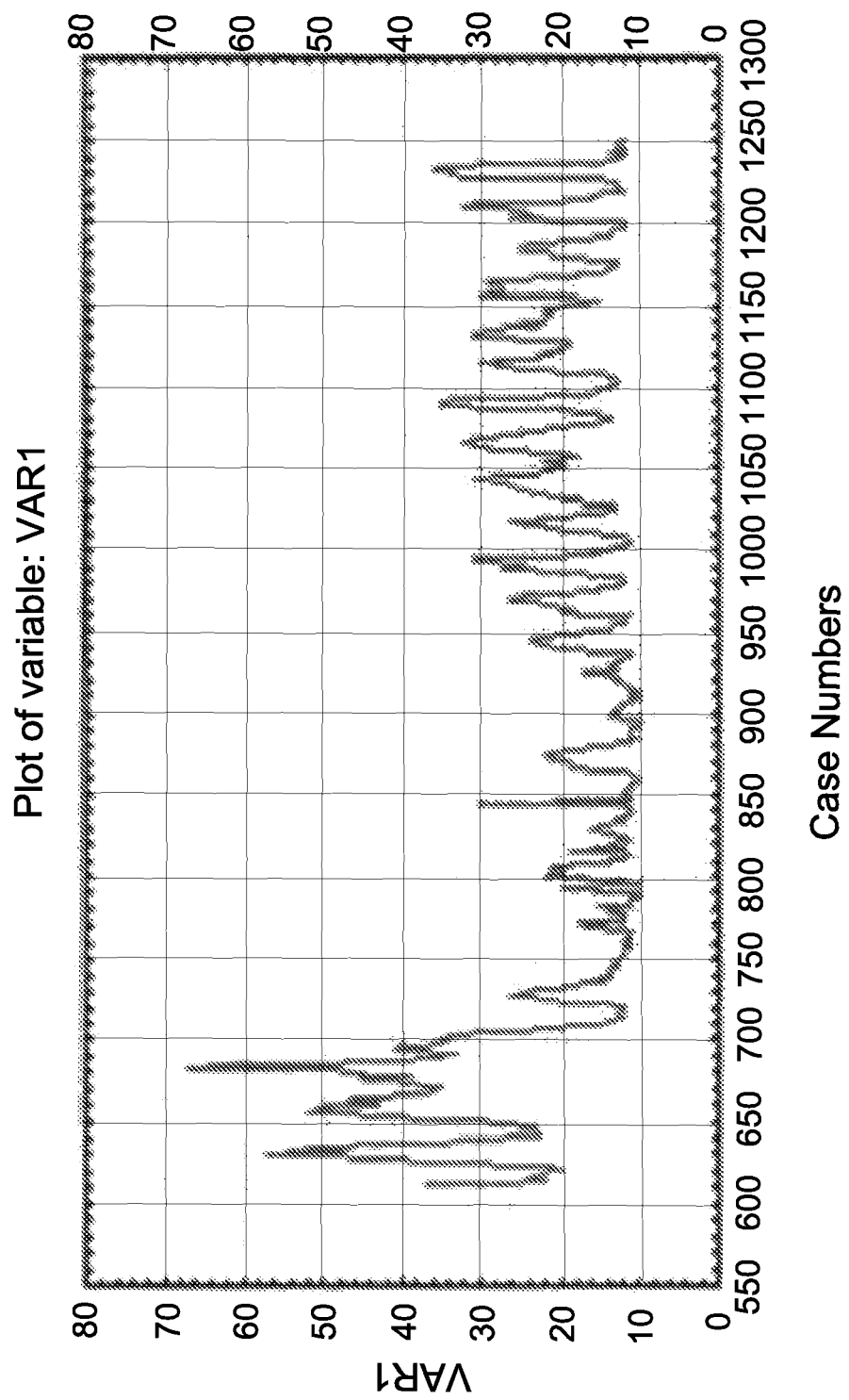
FIGS. 4A-B provide an example x-ray response signal and the corresponding enhanced response x-ray signal, respectively.
Figure 4B:
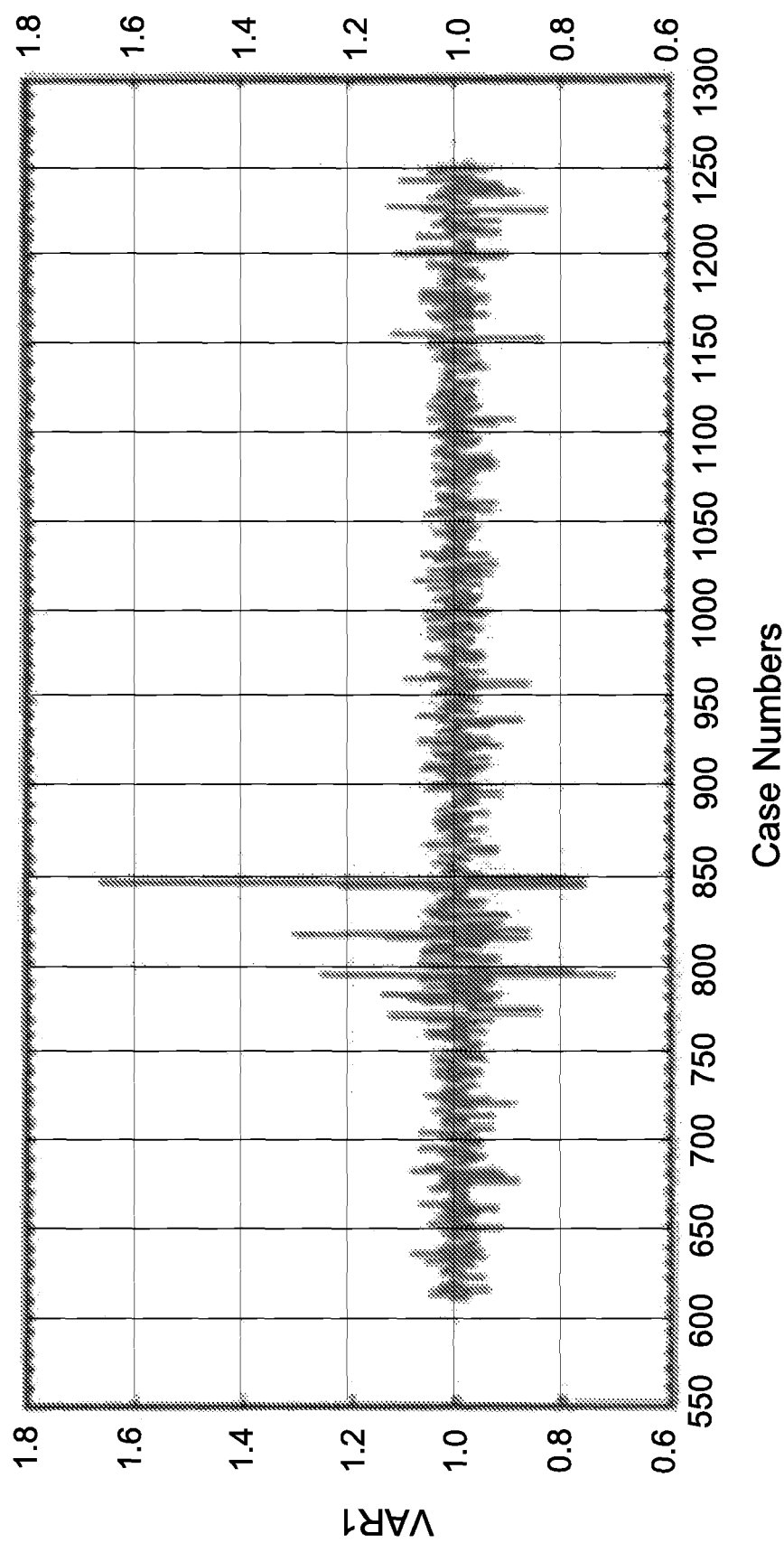

In FIGS. 4A and 4B an example x-ray response signal and the corresponding enhanced response x-ray signal are respectively shown. As shown, much of the noise and clutter appearing in the response x-ray signal is suppressed in the enhanced response signal. The prominent peaks appearing in the enhanced response signal of FIG. 3B associated mainly with the authenticating signals. Consequently, the enhanced response signal enables the user to identify the presence of the authenticating signals with better sensitivity, as can be seen by comparing the scale of the y-axes in FIGS. 4A and 4B. This improved sensitivity allows the user to detect and identify significantly smaller amounts of markers and binders found in the marking composition. For example, the method 100 allows the user to detect markers within the marking composition in concentrations of 0.1-100 ppm. Furthermore, the enhanced response signal can be used to measure the concentrations of the different markers and the binder within the marking composition to a high accuracy (e.g. 0.1-100 ppm).

In procedure 110 the authenticating signals are identified in the enhanced response signal, and the authenticity of the metallic object is determined according to the presence of these signals. For example, the metallic object may be deemed as authentic if the marking signals (one or more) are detected, alternatively the metallic object may be deemed authentic only if in addition to the marking signal one or both of (i) the at least one auxiliary signal and (ii) at least one XRF signatures of at least one of the metals present in the metallic object, are identified in the enhanced response signal.

Reference is now made to FIG. 2 which is a schematic illustration of a method for marking and authenticating metallic objects, generally referenced 200, according to a further embodiment of the present invention. Procedures 202 and 204 of the method 200 is carried out in a first preparation stage, in which the metallic object is marked and according with a preselected code. Procedures 206-214 are carried out in a later authentication stage. Procedures 206-210 are generally similar to procedures 104-108 of method 100 described above and therefore would not be described in detail below.

In procedure 202 a marking composition including one or more markers and one or more binders, is applied to the metallic object, wherein the concentrations of the one or markers and the one or more binders in the marking are determined according to a preselected code. Hence, for example, using a single marker which may be present in the marking composition in K different concentrations corresponds to a preselected code with K different code-words (each code-word corresponding to a different concentration). In case where N different markers are used each in K possible concentrations, a corresponding preselected code includes K to the power of N code-words.

The application of the marking composition is implemented similarly procedure 102 of method 100. The particular markers and binders present in the marking composition and their concentrations within the marking composition are set according to a preselected code. The preselected code may be used purely for authentication purposes. That is, the code is used to verify at a later stage that the metallic object includes the markers and binders in the correct concentrations as preselected. Alternatively, the code may be used also to provide additional information associated with the metallic object and/or the production process, such as the production/marking date, the identity of the manufacturer, a production/serial number, or the production cite of the metallic object. In procedure 204 the preselected code is a database. The preselected code may also include information relating to the concentration of at least one metal in the metallic object.

In procedures 206 the metallic object is irradiated with x-ray or gamma-ray radiation causing the metallic object and the marking composition to generate x-ray signals in response, and in procedure 208 the response x-ray signal arriving from the metallic object is detected in a similar way to procedures 104 and 106 of method 100 respectively. Likewise, in procedure 210 response x-ray signal is processed to obtain an enhanced response signal similarly to procedure 108 of method 100.

In procedure 212 the enhanced response signal is utilized to measure the concentrations of the one or more markers and the binder associated with the auxiliary signal. Since the enhanced response signal, in which noise and clutter are greatly reduced a very accurate measurement, allows for an accurate measurement even for very low concentrations of the markers and binders. Additionally, the concentration of the at least one of the metals present in the metallic object and associated with the preselected code may also be measured.

Since the accuracy and resolution of the measurement of the different concentrations in high (for example up to 0.5-30 ppm) the number of different concentrations of each of the marker/binder included in the preselected code is relatively high. For example, 10-200 different level of concentrations for each marker or binder may be included in the marking composition and the preselected code.

In procedure 214 the concentrations measured in procedure 212 are compared with the concentrations derived from the preselected code and the authenticity of the metallic object is determined accordingly. In an example in order for the metallic object to be deemed authentic the concentrations measured in procedure 212 must fully agree with the concentrations level as derived from the preselected code. Alternatively, a certain margin of error can be tolerated and the metallic object is deemed authentic if the concentrations measured in procedure 212 are similar up to a selected error margin to the concentration derived from the preselected code.

Reference is now made to FIG. 3 which is a schematic illustration of a system for marking and authenticating metallic objects (hereinafter "authenticating system") (e.g. spheres), generally referenced 300, according to an embodiment of the present invention. System 300 includes a marking module 302, a reading module 304, a signal processor 306, and a database 308. Reading module 304 includes a radiation emitter 310 and a radiation detector 312. The processor 306 is coupled to the reading module 304 and to the database 308. The database may also be coupled to the marking module 302.

The marking module 302 may apply the marking composition to new coins at the production site of the metallic objects during the production process or in a post-production stage. Alternatively, the marking may be applied to metallic objects that have already been used at a separate designated facility. The marking module may be configured, for example, to carry out the procedure 104 of method 100 to apply a marking composition to a metallic object comprising at least one marker and a binder.

The different markers and binders included in the marking composition and their respective concentrations may be determined according to a preselected code. Namely the preselected code is used as a 'recipe' for preparing the marking composition. The preselected code may be stored in database 208.

The reading module 304 is configured to emit an x-ray and/or gamma-ray radiation (primary radiation) towards the metallic object under examination and detect the response x-ray signal (secondary radiation) that is emitted in response from the metallic object. The radiation emitter 310 emits an x-ray and/or gamma-ray radiation towards the metallic object and the detector 312 detects the response x-ray signal arriving from the metallic object. The reading module transmits the response x-ray signal to the signal processor 306 and optionally to the database 308 as well. The reading module may be constructed as a single device such as handheld or portable XRF analyzer, or a benchtop XRF spectroscopy device. Alternatively, radiation emitter 310 and radiation detector 312 may be constructed as separate devices. The reading module 304 may be either of-the-shelf device integrated within the authenticating system 300 or a device which is specifically designed and constructed for exciting and detecting a response signal from the metallic object. The reading module 304 may be configured, for example, to carry out procedures 104 and 106 of method 100 to irradiate the metallic object with x-ray or gamma ray radiation and to detect the response x-ray signal arriving from the metallic object.

The signal processor 306 receives the response x-ray signal from the reading module and processes it so as to filter out the background radiation noise and clutter from the response signal. It should be noted, that common filtration methods such as for example quasi-Gaussian spectroscopy amplifier and Gaussian filtering if applied naively to the response x-ray signal may reduce or obscure also the authentication signals. To overcome this problem the signal processor 306 may employ more advanced methods for processing the response signal, for example statistical methods such as time series analysis in order to obtain an enhanced response signal with an improved SNR and SCR. The signal processor may be configured, for example, to carry out procedures 106 and 108 of method 100 to process the response x-ray signal and obtain an enhanced response signal, and to identify the at least one marking signal and optionally the auxiliary signal an/or the XRF signature of at least one of the metals present within the metallic object.

According to some embodiments of the present invention, the signal processor 306 may also measure the concentrations of the markers and binders present within the marking composition, and in addition the concentration of one or more metals present within the metallic object. The signal processor is also configured to compare the measured concentrations with the concentrations derived from the preselected code which is stored in the database 208, and determine its authenticity accordingly. The signal processor may be configured, for example, to carry out the procedures 212 and 214 of method 200 to utilize the enhanced response signal to measure the concentrations of the at least one marker and optionally at least one of the materials present in the binder within the marking composition, and optionally the concentration of at least one metal within the metallic object, and to compare the measured concentrations of the at least ones marker and optionally at least one of the materials present in the binder, and at least of the metals present in the metallic object to the preselected code.

The invention claimed is:

1. A method for marking and authenticating a metallic object, the method comprising
    applying a marking composition on at least a surface region of the metallic object, in an amount or in a pattern indicating authenticity,
        said marking composition comprising at least one XRF-sensitive marker in an amount between 0.1 and 10,000 ppm, at least one surface binding material, and at least one etchant; and
        irradiating said object with x-ray or gamma-ray radiation to detect an x-ray response signal and
        processing the detected x-ray response signal to obtain an enhanced response signal,
    wherein the enhanced response signal identifies at least one marker signal associated with the at least one XRF-sensitive marker, and at least one of (i) auxiliary signal associated with the at least binding material and (ii) a signal indicative of at least one of the metals present in the metallic object, to thereby determine object authenticity.

2. The method according to claim 1, wherein the application of the marking composition is achieved by a method selected from immersion, dipping, printing, wiping, painting, ultrasonic spray nozzle coating, ultrathin polymeric, spin coating, hot melt coating, knife-over-roll coating, conformal coating, electrolytic plating, electroless plating, plasma spraying, and electrophoretic deposition (EPD).

3. The method according to claim 1, wherein the amount of said marker is between about 0.1 and 200 ppm.

4. The method according to claim 1, wherein the amount of said marker is between about 0.1 and 20 ppm.

5. The method according to claim 1, wherein the XRF sensitive marker is a compound comprising one or more element which in response to X-Ray or gamma-ray radiation emits an x-ray signal with spectral features characteristic of the element.

6. The method according to claim 1, wherein said element is selected from Si, P, S, CI, K, Ca, Br, Ti, Fe, V, Cr, Mn, Co, Ni, Ga, As, Fe, Cu, Zn, Ga, Rb, Sr, Y, Zr, Nb, Mo, Tc, Ru, Rh, Ag, Cd, In, Sn, Sb, Te, I, Cs, Ba, La and Ce.

7. The method according to claim 1, wherein the composition further comprising at least one polymerization initiator, and optionally at least one agent selected from at least one adhesion promoter, at least one wetting agent, at least one dispersant and at least one solvent.

8. The method according to claim 1, wherein the composition further comprising at least one adhesion promoter and at least one agent selected from at least one polymerization initiator, at least one wetting agent, at least one dispersant and at least one solvent.

9. The method according to claim 1, wherein the composition further comprising at least one wetting agent and at least one agent selected from at least one polymerization initiator, at least one adhesion promoter, at least one dispersant and at least one solvent.

10. The method according to claim 1, wherein the composition further comprising at least one agent selected from at least one polymerization initiator, at least one adhesion promoter, at least one wetting agent, at least one dispersant and at least one solvent.

11. The method according to claim 1, wherein the composition comprising at least one marker, at least one dispersant and optionally at least one agent selected from at least one polymerization initiator, at least one adhesion promoter, at least one wetting agent, and at least one solvent.

12. The method according to claim 1, wherein the composition comprising at least one marker, at least one polymerization initiator, at least one adhesion promoter, at least one wetting agent, at least one dispersant and at least one solvent.

13. The method according to claim 1, wherein the application of the marking composition is by a method selected from immersion, dipping, printing, wiping, painting, ultrasonic spray nozzle coating, ultrathin polymeric coating, spin coating, hot melt coating, knife-over-roll coating, conformal coating, electrolytic plating, electroless plating, plasma spraying, and electrophoretic deposition (EPD).

14. The method according to claim 1, wherein the processing is selected from time series technique and Gaussian filtering.

15. A method for marking and authenticating a metallic object, the method comprising applying a marking composition on at least a surface region of the metallic object, in an amount or in a pattern indicating authenticity, said marking composition comprising at least one XRF-sensitive marker in an amount between 0.1 and 10,000 ppm, at least one surface binding material, and at least one etchant;

said applying being by a vacuum deposition method; and irradiating said object with x-ray or gamma-ray radiation to detect an x-ray response signal and processing the detected x-ray response signal to obtain an enhanced response signal, wherein the enhanced response signal identifies at least one marker signal associated with the at least one XRF-sensitive marker, and at least one of (i) auxiliary signal associated with the at least binding material and (ii) a signal indicative of at least one of the metals present in the metallic object, to thereby determine object authenticity.

16. The method according to claim 15, the vacuum deposition method is selected Chemical Vapor Deposition (CVD), low-pressure chemical vapor deposition (LPCVD), Plasma-Enhanced Chemical Vapor Deposition (PECVD), Plasma-Assisted CVD (PACVD), and Atomic Layer Deposition (ALD).

* * * * *